(No Model.) 2 Sheets—Sheet 2.

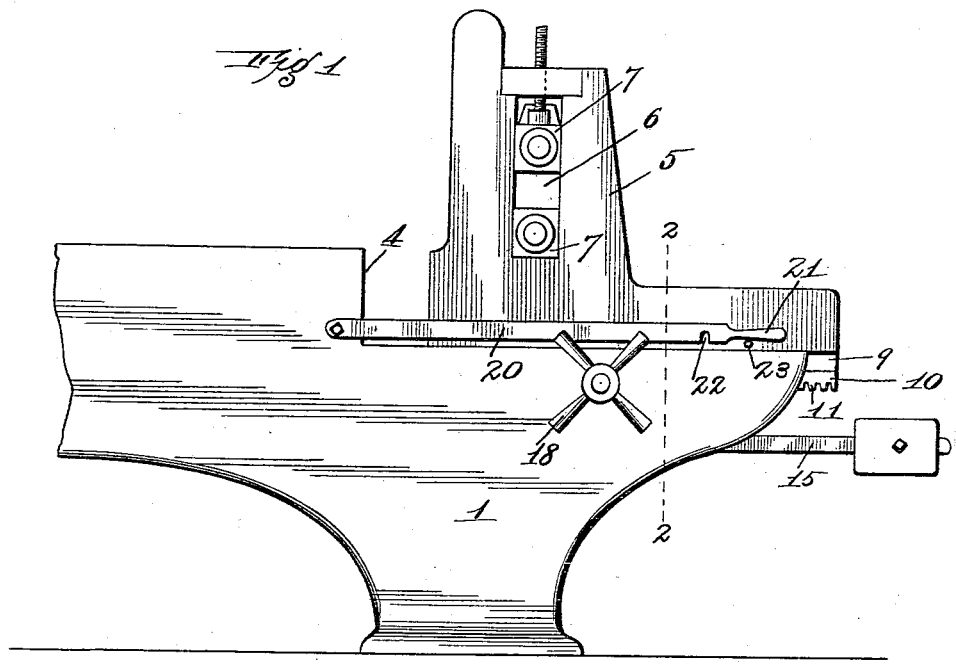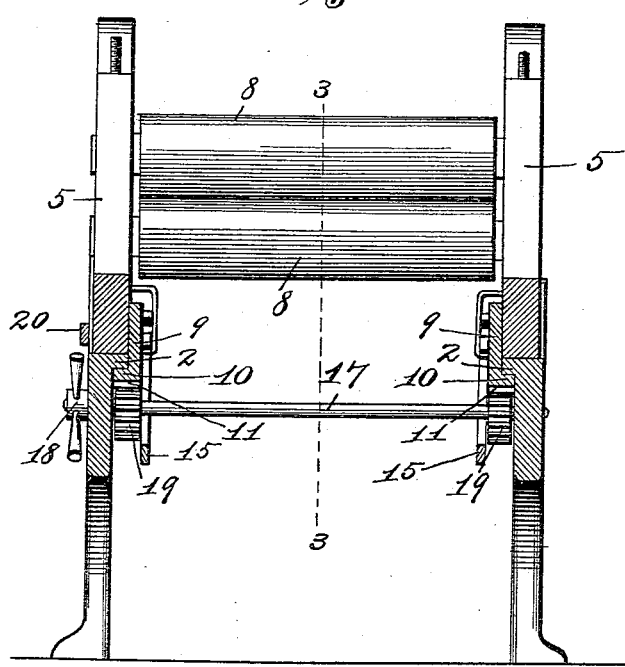

E. JUDD.
WOODWORKING MACHINERY.

No. 555,378. Patented Feb. 25, 1896.

Attest
John L. Tunison
M. P. Smith

Inventor
Edwin Judd
By Higdon & Higdon & Longan
Attys

United States Patent Office.

EDWIN JUDD, OF ST. LOUIS, MISSOURI, ASSIGNOR TO THE HALL & BROWN WOOD WORKING MACHINE COMPANY, OF SAME PLACE.

WOODWORKING MACHINERY.

SPECIFICATION forming part of Letters Patent No. 555,378, dated February 25, 1896.

Application filed June 13, 1895. Serial No. 552,645. (No model.)

*To all whom it may concern:*

Be it known that I, EDWIN JUDD, of the city of St. Louis, State of Missouri, have invented certain new and useful Improvements in Woodworking Machinery, of which the following is a full, clear, and exact description, reference being had to the accompanying drawings, forming a part hereof.

My invention relates to an improved planing-machine; and it consists in the novel construction, combination, and arrangement of parts hereinafter described and claimed.

Figure 3:
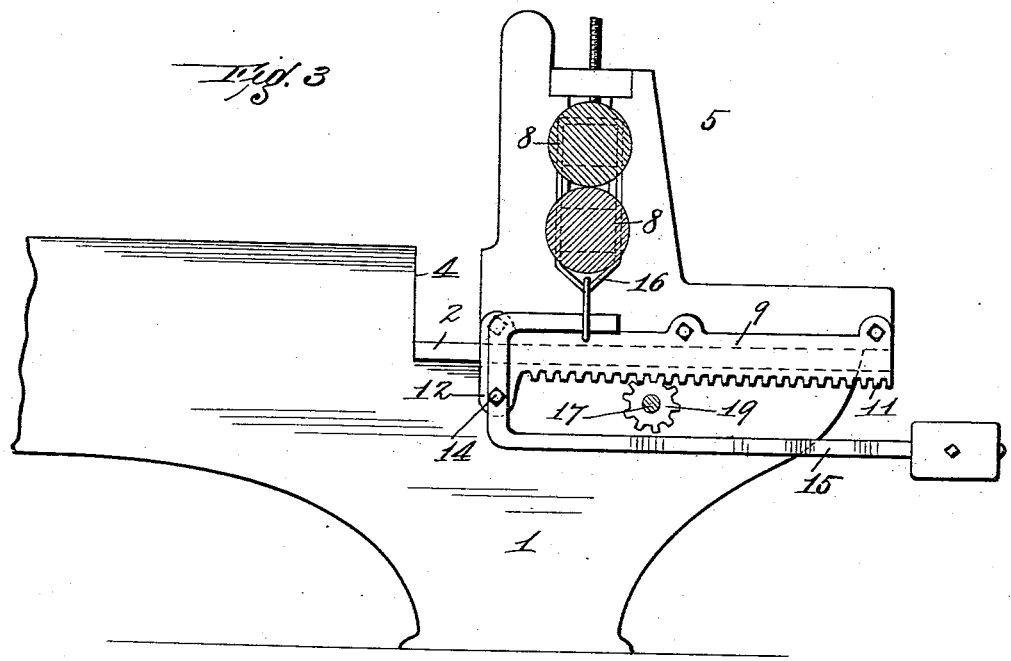
Figure 4:
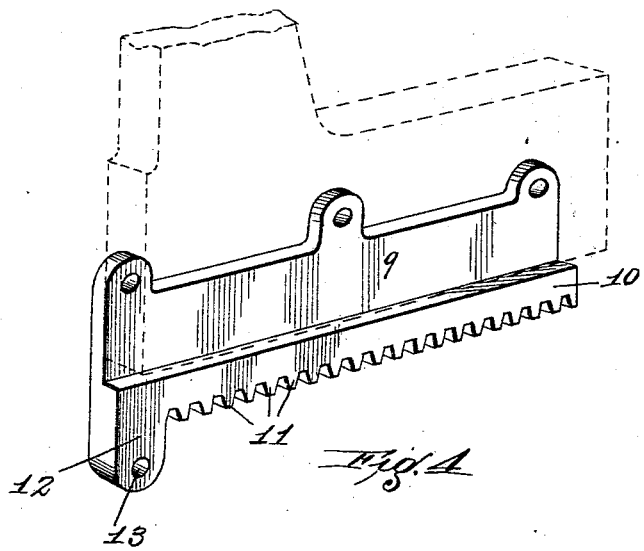

In the drawings, Figure 1 is a side elevation of the rear end of a planing-machine. Fig. 2 is a vertical sectional view taken approximately on the indicated line 2 2 of Fig. 1. Fig. 3 is a longitudinal sectional view taken approximately on the indicated line 3 3 of Fig. 2. Fig. 4 is a view in perspective of one of the racks I employ in carrying out my invention.

Referring by numerals to the accompanying drawings, 1 1 indicate the side portions of the frame of the planer, said frame being of the ordinary construction. Upon the inner faces of the side frames 1, adjacent the top edges thereof, are formed rectangular flanges 2, that extend along the frame to vertical faces 4 formed in said frame, said vertical faces being a slight distance in front of the lower cutter-head of the planer.

5 5 indicate portions of the frame that are arranged to slide longitudinally upon the rear ends of the side frames 1, and said portions 5 are provided with vertical recesses 6, in which are mounted for vertical movement journal-bearings 7, in which the ends of feed-rollers 8 are journaled. Bolted to the inner faces of each of the portions 5 of the frame, and extending downwardly from the lower edges thereof, are plates 9, the lower portions 10 of which are widened, and said widened portions extend beneath the flanges 2 on the upper inner edges of the side frames 1. The lower sides of these widened portions 10 are formed into teeth 11, and the forward ends 12 of the plates 9 extend downwardly and are provided with apertures 13. In these apertures 13 are located bolts 14, upon which are pivoted weight-carrying bars 15, that engage the yokes 16 that govern the vertical movement of the upper feed-roller, these parts being all of the ordinary construction.

Journaled in the side frames, 1 and extending transversely between the same, is a shaft 17, upon one end of which is fixed a hand-wheel 18. Upon this shaft 17, inside the side frames 1, are fixed pinions 19, that are arranged to mesh with the teeth 11 formed in the under sides of the widened portions 10 of the plates 9.

A lock-lever 20 is pivoted to one of the side frames 1 immediately at the rear of the vertical face 4 therein and extends horizontally along the lower portion of one of the portions 5 of the frame. The outer end of this lever 20 is formed into a handle 21, and a notch 22 is formed in the lower edge of said lever immediately in front of said handle.

A pin 23 is fixed in and extends laterally from the face of the portion 5 of the frame adjacent this lever 20, and when the portions 5 of the frame are moved against the vertical faces 4 of the side frames 1 the notch 22 will engage over the pin 23 and securely hold the portions 5 of the frame and contiguous parts against lateral movement.

When the planing-machine is in operation it is intended that the portions 5 of the frame be moved to their fullest limit toward the vertical faces 4 of the side frames 1, thus carrying the feed-rollers 7 in close proximity to the cutter-heads of said planer. When it is desired to move the portions 5 of the frame and the feed-rollers 7 away from the cutter-heads in order to gain access thereto, the operator grasps the handle 21 and raises the same, and by so doing disengages the pin 23 from the notch 22, and simultaneous with this movement the hand-wheel 18 is turned in the direction indicated by the arrow A, Fig. 1. As said hand-wheel is turned, rotary motion is imparted to the shaft 17, and the pinions 19 mounted upon said shaft will rotate with said shaft and engage in the teeth 11 of the plates 9 and move said plates and the entire portions 5 of the frame to which said plates are bolted in the direction indicated by the arrow B, Fig. 1. As said portions 5 carrying the feed-rollers, weight-bars, &c., are moved away from the vertical faces 4 of the side frames 1, the operator can very easily reach or gain access to the lower cutter-head in order to inspect, clean, or remove the same, this being the end contemplated by my invention.

A planing-machine frame constructed in accordance with my invention is simple, inexpensive, easily and expeditiously manipulated, and allows the attendant or operator of the machine free access to the lower cutter-head.

I claim—

1. In a planing-machine, an auxiliary framework arranged to move longitudinally in the rear of the lower cutter-head and carrying the feed-rollers, racks bolted to said auxiliary frame, a shaft passing transversely through the main frame, a hand-wheel fixed upon said shaft outside the main frame, and pinions mounted upon said shaft within said main frame to engage the teeth of the racks secured to the movable frame.

2. In a planing-machine, an auxiliary frame carrying feed-rollers and arranged to move longitudinally in the rear of the cutter-head, racks bolted to the lower inner faces of said auxiliary frame, a shaft journaled transversely in the main frame, a hand-wheel fixed upon said shaft outside said main frame, pinions fixed upon said shaft within the main frame to engage the teeth of the racks, and a lock-lever pivoted to the side of the main frame and arranged to lock the auxiliary frame at a certain position.

In testimony whereof I affix my signature in presence of two witnesses.

EDWIN JUDD.

Witnesses:
  CHAS. S. BROWN,
  ALFRED WEBB.